United States Patent
Marks

(10) Patent No.: US 9,868,508 B2
(45) Date of Patent: Jan. 16, 2018

(54) RIB FOOT FOR AIRCRAFT WING

(71) Applicant: AIRBUS OPERATIONS LIMITED, Bristol (GB)

(72) Inventor: Oliver Marks, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 121 days.

(21) Appl. No.: 14/793,030

(22) Filed: Jul. 7, 2015

(65) Prior Publication Data
US 2016/0009367 A1   Jan. 14, 2016

(30) Foreign Application Priority Data

Jul. 8, 2014 (GB) .................................. 1412155.2

(51) Int. Cl.
*B64C 3/38* (2006.01)
*B64C 3/18* (2006.01)
*B64C 3/26* (2006.01)

(52) U.S. Cl.
CPC ................ *B64C 3/187* (2013.01); *B64C 3/26* (2013.01)

(58) Field of Classification Search
CPC .... B64C 3/18; B64C 3/26; B64C 1/12; B64C 3/187; B64C 5/00; B64C 3/182; B64C 3/00
See application file for complete search history.

(56) References Cited

U.S. PATENT DOCUMENTS

| | | | |
|---|---|---|---|
| 2,392,788 A | 1/1946 | Watter | |
| 4,210,694 A | 7/1980 | Fogg, III | |
| 4,228,976 A * | 10/1980 | Eiselbrecher | B64C 1/26 244/131 |
| 5,242,523 A | 9/1993 | Willden et al. | |
| 6,386,481 B1 | 5/2002 | Kallinen | |
| 6,415,496 B1 * | 7/2002 | Dominguez Casado | B64C 1/06 244/131 |
| 8,056,859 B2 * | 11/2011 | Kunichi | B21J 15/14 244/123.1 |

(Continued)

FOREIGN PATENT DOCUMENTS

| | | |
|---|---|---|
| CN | 103538715 A | 1/2014 |
| DE | 102011017460 A1 * | 10/2012 ............... B64C 3/18 |

(Continued)

OTHER PUBLICATIONS

European Search Report dated Dec. 14, 2015 EP Application No. 15 17 5756.

*Primary Examiner* — Assres H Woldemaryam

(74) *Attorney, Agent, or Firm* — Hauptman Ham, LLP

(57) ABSTRACT

The invention relates to a rib foot having a blade formed by first and second blade parts that are connected by a bite. The rib foot has a first base part that is connected to the first blade part by a first corner and a second base part that is connected to the second blade part by a second corner. The rib foot also has a first flange that is connected to and extends away from the first base part and a second flange that is connected to and extends away from the second base part. The blade and base parts are formed from a composite material that includes reinforcement fibers embedded in a matrix. At least some of the reinforcement fibers run continuously from the first base part into the second base part via the first corner, the blade and the second corner.

13 Claims, 6 Drawing Sheets

(56) References Cited

U.S. PATENT DOCUMENTS

| | | |
|---|---|---|
| 2001/0051251 A1 | 12/2001 | Noda et al. |
| 2005/0241358 A1* | 11/2005 | Kaye .................. B64F 5/10 |
| | | 72/379.2 |
| 2006/0226287 A1 | 10/2006 | Grantham et al. |
| 2008/0173757 A1 | 7/2008 | Tanner et al. |
| 2008/0223987 A1* | 9/2008 | Halme .................. B64C 3/187 |
| | | 244/123.1 |
| 2009/0200425 A1 | 8/2009 | Kallinen et al. |
| 2010/0148008 A1* | 6/2010 | Hernando .............. B64C 3/187 |
| | | 244/131 |
| 2011/0089291 A1 | 4/2011 | Dietrich et al. |
| 2013/0001360 A1 | 1/2013 | Wildman |
| 2013/0048187 A1* | 2/2013 | Wiles .................. B29C 70/086 |
| | | 156/60 |
| 2013/0119191 A1* | 5/2013 | Wolfe .................. B29C 70/42 |
| | | 244/54 |
| 2013/0344291 A1* | 12/2013 | Pearson .............. B29C 70/865 |
| | | 428/157 |
| 2014/0113107 A1* | 4/2014 | Kremer ................ B64C 3/18 |
| | | 428/121 |
| 2014/0166811 A1* | 6/2014 | Roming ................ B64C 1/061 |
| | | 244/131 |
| 2014/0216638 A1* | 8/2014 | Vetter ................ B29D 99/0014 |
| | | 156/227 |

FOREIGN PATENT DOCUMENTS

| | | |
|---|---|---|
| EP | 1942052 A1 | 7/2008 |
| EP | 2481668 A1 | 8/2012 |
| EP | 2565021 A1 | 3/2013 |
| FR | 2923800 A1 | 5/2009 |
| WO | 2008041019 A1 | 4/2008 |
| WO | 2008067460 A2 | 6/2008 |
| WO | 2012098331 A2 | 7/2012 |
| WO | 2015015152 A1 | 2/2015 |

* cited by examiner

RIB FOOT FOR AIRCRAFT WING

RELATED APPLICATIONS

The present application claims priority from Great Britain Application Number 1412155.2, filed Jul. 8, 2014, the disclosure of which is hereby incorporated by reference herein in its entirety.

FIELD OF THE INVENTION

The present invention relates to a rib foot, and a structure including a rib foot. More particularly, although not exclusively, the present invention relates to an aircraft structure, for example a rib foot for a wing, horizontal stabiliser or vertical stabiliser.

BACKGROUND OF THE INVENTION

Traditional aircraft wings have a wing box formed by upper and lower aerodynamic covers, front and rear spars, and a series of transverse ribs spaced apart along the span-wise length of the wing box. Each rib is bolted to the upper and lower covers via rib feet, and reacts fuel pressure loads between them.

Assembly of such a wing box can be very time consuming and complicated due to the need to manufacture, drill, shim, and then bolt many components together. A traditional wing box is also very heavy and does not always make the most efficient use of modern aerospace materials such as composites.

It is desirable to design an aircraft wing box or similar structure which has a reduced part count, simplified manufacturing process and improved mechanical performance.

SUMMARY OF THE INVENTION

A first aspect of the invention provides a rib foot having a blade extending from a blade foot to a blade tip; a first base part connected to the blade foot by a first corner; a second base part connected to the blade foot by a second corner; a first flange part connected to and extending from the first base part; and a second flange part connected to and extending from the second base part; wherein the blade and the base parts are formed from a composite material including reinforcement fibres, preferably embedded in a matrix, and at least some of the reinforcement fibres run continuously from the first base part into the second base part via the first corner, via a bight at the blade tip, and via the second corner.

The continuous construction of the blade enables it to be formed as a single piece. This enables the number of components in the structure to be reduced and provides potential for the overall weight of the complete structure to be reduced.

Typically the blade and the first and second base parts are formed integrally. By way of example the blade and the first and second base parts may be formed as a single piece which is then bent or folded to form the first and second corners and the bight. Alternatively the blade and the first and second base parts may be formed integrally by laying them up on a mould tool with an automated tape laying machine, with a first curve at the first corner, a second curve at the second corners and the bight being formed as the tape is laid onto the mould tool.

Regardless of the method of formation of the blade, the reinforcement fibres which run round the corners provide efficient load transfer between the adjacent parts of the blade which are connected by the corners and the bight.

The construction of the rib foot also enables multiple flange angles to be accommodated or compensated for, which reduces the time and cost associated with controlling joints for tolerance and fit requirements.

Preferably the blade comprises at least one layer which runs round the first and second corners and the bight.

The first flange part may be connected to the first base part by a third corner and at some of the reinforcement fibres may run continuously from the first base part into the first flange part via the third corner.

The second flange part may be connected to the second base part by a fourth corner and at least some of the reinforcement fibres may run continuously from the second base part into the second flange part via the fourth corner.

Alternatively the first and second flange parts may be bonded or fastened to the first and second base parts, respectively, with no reinforcement fibres running between the flange part and the base part.

The first flange part may be formed from a separate piece which is connected to the first base part by a bonded joint, or the second flange part may be formed from a separate piece which is connected to the second base part by a bonded joint. In one embodiment the first and second flange parts are formed together as a single piece which is bonded to the first and second base parts.

The first base part may extend away from a first side of the blade foot, and the second base part may extend away from a second side of the blade foot opposite to the first side of the blade foot.

The blade and the base parts may be formed from a composite material having a plurality of layers. At least one of the layers may include reinforcement fibres, preferably embedded in a matrix, which run continuously from the first base part into the second base part via the first corner, a bight at the blade tip, and the second corner.

The reinforcement fibres may, for example, comprise carbon fibres and/or glass fibres and/or Kevlar fibres and/or metal fibres.

The matrix may be, for example, a polymer or a metal material. The polymer may be a thermosetting polymer such as an epoxy resin, or a thermoplastic polymer.

The rib foot may comprise a laminar material with a plurality of layers. Each folded corner and the bight typically comprises a plurality of layers which run continuously round the corners and the bight.

The rib foot may be formed by arranging a stack of dry reinforcement plies together and subsequently adding matrix material to the stack before curing to form a consolidated component, or alternatively by arranging a stack of pre-preg plies comprising reinforcement material before curing to form a consolidated component.

The blade may be contacted by the flange parts, but more preferably there is a gap between the flange parts and the blade.

A second aspect of the invention provides structure having a panel, a stringer and a rib; wherein the stringer includes a stringer flange joined to the panel and a stringer web extending away from the stringer flange; and the rib includes a rib web and a rib foot according to the first aspect of the invention with its blade joined to the rib web, its first and second base parts joined to the panel or to the stringer flange, and its first and second flange parts joined to the stringer web.

The first and second flanges may be joined to the stringer web by co-bonded or co-cured joints.

The connection between the first and second flange parts and the stringer web provides a robust load path. Typically the first and second flange parts are joined to the stringer web by a joint which can transmit load in shear from the stringer web to the first and second flange parts.

The first and second base parts may be joined to the panel or to the stringer flange by co-bonded or co-cured joints.

The structure may only have a single panel. Alternatively, the structure may further comprise a second panel opposite to the first panel. The rib web is arranged to transmit load (such as fuel pressure load) between the first panel and the second panel. Typically, the rib web is joined to the second panel, either directly or via additional rib feet.

The structure may have only one stringer, but more typically it has a plurality of stringers joined to the panel with each stringer joined to the rib web via a respective rib foot. Preferably each rib foot has a blade extending from a blade foot to a blade tip; a first base part connected to the blade foot by a first corner; a second base part connected to the blade foot by a second corner; a first flange part connected to and extending from the first base part; and a second flange part connected to and extending from the second base part; wherein the blade and the base parts are formed from a composite material including reinforcement fibres, preferably embedded in a matrix, and at least some of the reinforcement fibres run continuously from the first base part into the second base part via the first corner, via a bight at the blade tip, and via the second corner. Each rib foot has its blade joined to the rib web, its first and second base parts joined to the panel or to a stringer flange of a respective one of the stringers, and its first and second flange parts joined to a stringer web of the respective one of the stringers.

The structure may have only one rib, or it may have more than one rib with each rib joined to the stringer by a respective rib foot.

The panel is typically elongate with a width and a length.

The stringer is typically elongate with a width and a length.

The length of the panel and the stringer are typically approximately parallel.

The rib typically extends across the width of the panel.

The stringer may have a variety of cross-sectional shapes, including a T-shape, a Z-shape or a top hat shape.

The stringer web may be a blade which extends away from the stringer to an elongate edge.

The rib may form a liquid tight seal with the panel. Alternatively, the rib may allow liquid to flow across it, for example a gap may be provided between the rib web and the panel, the gap being arranged to permit liquid to flow through the gap.

Typically the rib web has an edge with a recess or a cut-out through which the stringer web passes. In the case of a sealed rib then the stringer web may form a liquid tight seal with the rib web. Alternatively, a gap is provided between the rib web and the stringer web, the gap being arranged to permit liquid to flow through the gap.

When present, the co-bonded or co-cured joints between the first and second flanges and the stringer web, and between the first and second base parts and the panel or stringer flange, remove or reduce the need for drilling and/or bolting through the rib foot, the stringer and/or the panel. This increases the strain resistance of the structure and reduces the component weight. The reduced number of external fasteners also provides protection against lightning strike and improved fuel tank sealing if the structure is part of a fuel tank.

Additionally or alternatively, the rib foot may be joined to the panel and/or to the rib web and/or to the stiffener flange and/or to the stringer web by one or more mechanical fasteners.

The structure may be adapted to carry fuel. In this case, the panel typically forms part of a sealed wall of a fuel tank which is arranged such that, when the fuel tank contains fuel, fuel pressure load acts on the panel.

The rib web may form a sealed fuel tank wall (that is a boundary wall adapted to retain fuel on one side of the wall with substantially no movement of fuel through the wall to an opposite side of the wall) or alternatively it may be an internal baffle (that is an internal element within a fuel tank adapted to allow fuel to pass from one side to the other via one or more orifices or holes).

The structure is typically part of an aerodynamic aircraft structure such as a wing box, a horizontal stabiliser or a vertical stabiliser. In this case the panel is typically a skin or cover panel with an outer aerodynamic surface over which air flows during flight of the aircraft, and an inner surface to which the stringer flange is joined. The stringer stiffens the panel and carries aerodynamic loads during flight of the aircraft.

A third aspect of the invention provides an aircraft comprising fuselage and a structure according to the second aspect of the invention that is attached to and extends away from the fuselage.

A fourth aspect of the invention provides a method of forming a rib foot, the method including the steps: (a) forming a blank from a composite material including reinforcement fibres, preferably embedded in a matrix, the blank comprising first and second blade parts, first and second base parts, and first and second flange parts; (b) bending or folding the blank where the first and second blade parts meet so that the first and second blade parts together form a blade with a blade foot and a blade tip; (c) bending or folding the blank where the first and second base parts meet the first and second blade parts to form respective first and second corners; and (d) bending or folding the blank where the first and second flange parts meet the first and second base parts to form respective first and second flanges which meet the first and second base parts at respective third and fourth corners; wherein at least some of the reinforcement fibres run continuously from the first base part into the second base part via the first corner, a bight at the blade tip, and the second corner; wherein at least some of the reinforcement fibres run continuously from the first base part into the first flange via the third corner; and wherein at least some of the reinforcement fibres run continuously from the second base part into the second flange via at the fourth corner.

The method of forming the structure may be automated, thereby enabling rapid manufacture of the structure and increased production rates.

BRIEF DESCRIPTION OF THE DRAWINGS

An embodiment of the invention will now be described with reference to the accompanying drawings, in which.

DETAILED DESCRIPTION OF EMBODIMENT(S)

Figure 1:
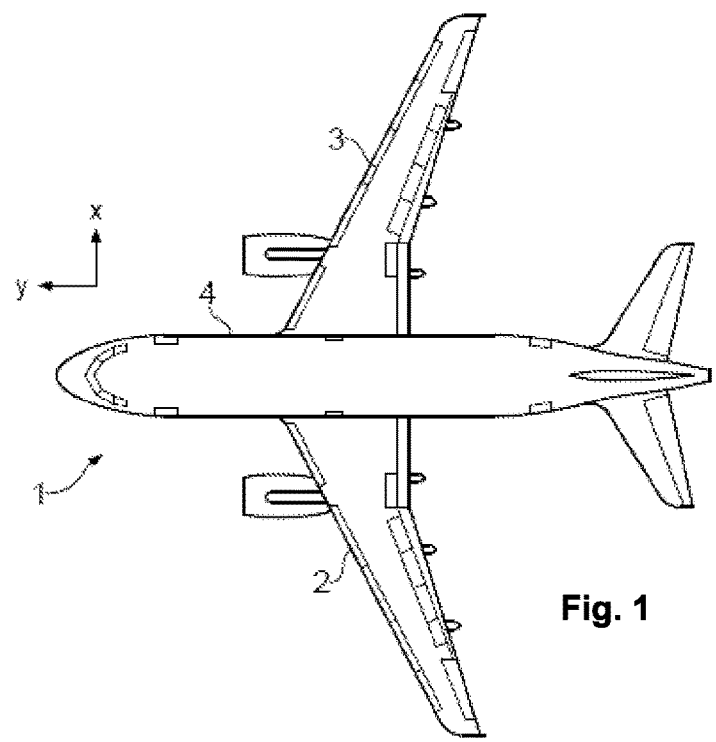
FIG. 1 is a plan view of an aircraft.

FIG. 1 shows an aircraft 1 with port and starboard wings 2, 3. Each wing has a cantilevered structure with a length extending in a span-wise direction from a root to a tip, the root being joined to an aircraft fuselage 4. The wings 2, 3 are similar in construction so only the starboard wing 3 will be described in detail with reference to FIGS. 2a and 2b.

Figure 2A:
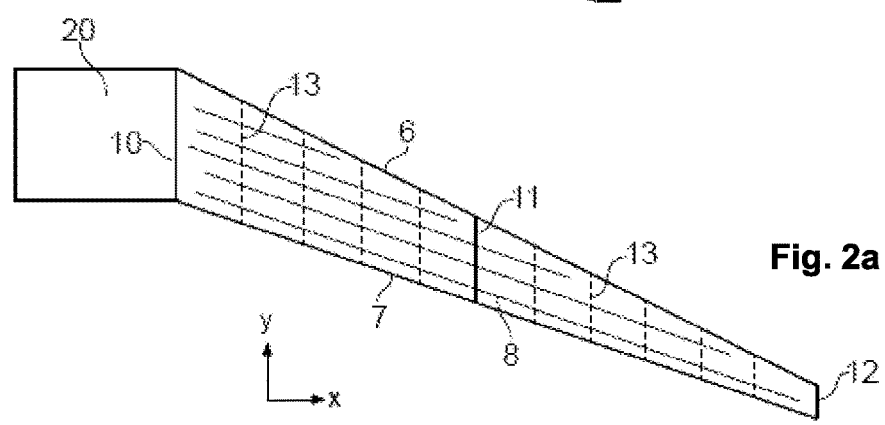
FIG. 2a is a schematic plan view of a starboard wing box and centre wing box.
Figure 2B:
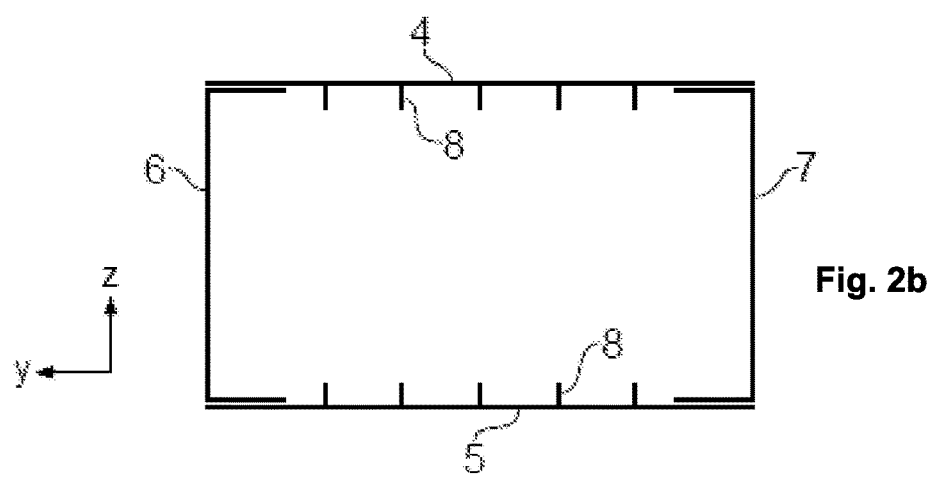
FIG. 2b is a schematic chord-wise sectional view of the starboard wing box.

The main structural element of the wing is a wing box formed by upper and lower panels or covers 4, 5 and front and rear spars 6, 7, as shown in FIGS. 2a and 2b. The covers 4, 5 and spars 6, 7 are each Carbon Fibre Reinforced Polymer (CFRP) laminate components. Each cover is a panel with an aerodynamic surface (the upper surface of the upper cover 4 and the lower surface of the lower cover 5) over which air flows during flight of the aircraft. Each cover also has an inner surface carrying a series of stringers 8 extending in the span-wise direction. Each cover carries a large number of elongate stringers 8, only five of which are shown in FIGS. 2a and 2b for the purposes of clarity. Each stringer 8 is joined to one cover but not the other, and runs in a span-wise direction approximately parallel to a length of the cover to which it is attached.

The wing box also has a plurality of transverse ribs which run in a chord-wise direction, approximately transverse to the stringers and across the width of the covers, each rib being joined to the covers 4, 5 and the spars 6, 7. The ribs include an innermost inboard rib 10 located at the root of the wing box, and a number of further ribs spaced apart from the innermost rib along the length of the wing box. The wing box is divided into two fuel tanks: an inboard fuel tank bounded by the inboard rib 10 and mid span rib 11, the covers 4, 5 and the spars 6, 7; and an outboard fuel tank bounded by the mid span rib 11 an outboard rib 12 at the tip of the wing box, the covers 4, 5 and the spars 6, 7.

The inboard rib 10 is an attachment rib which forms the root of the wing box and is joined to a centre wing box 20 within the body of the fuselage 4. Baffle ribs 13 (shown in dashed lines) form internal baffles within the fuel tanks which divide the fuel tanks into bays. The ribs 10, 11, 12 are sealed to prevent the flow of fuel out of the two fuel tanks, but the baffle ribs 13 are not sealed so that fuel can flow across them between the bays. As can be seen in FIG. 2a, the stringers 8 stop short of the inboard rib 10 and the outboard rib 12, but pass through the baffle ribs 13 and the mid span rib 11.

Figure 5A:
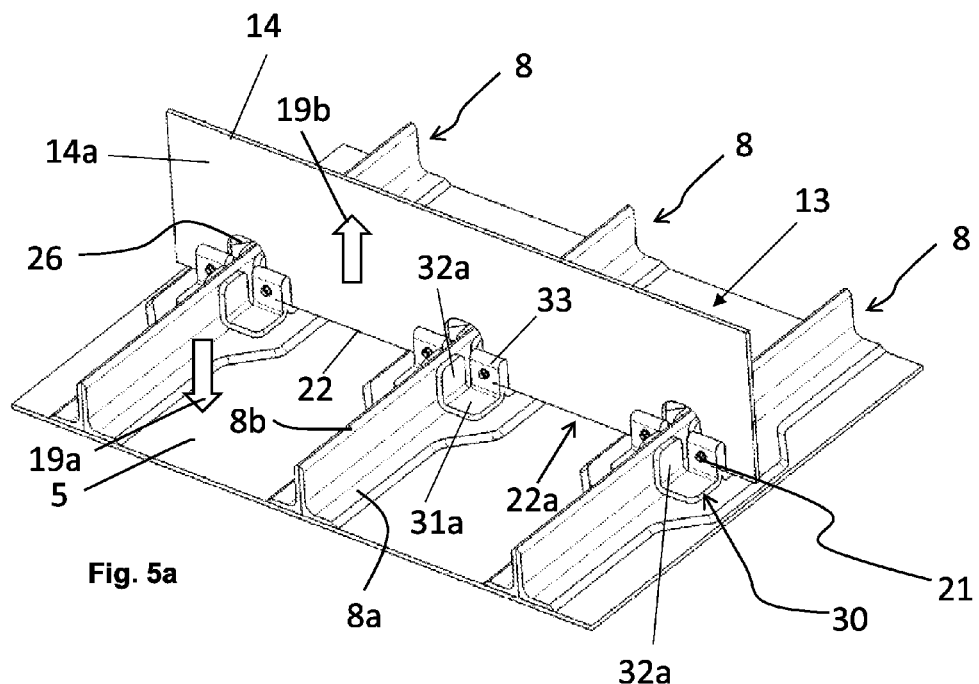
FIG. 5a is an isometric view of a structure including rib feet according to the first embodiment of the invention from the inboard direction.
Figure 5B:
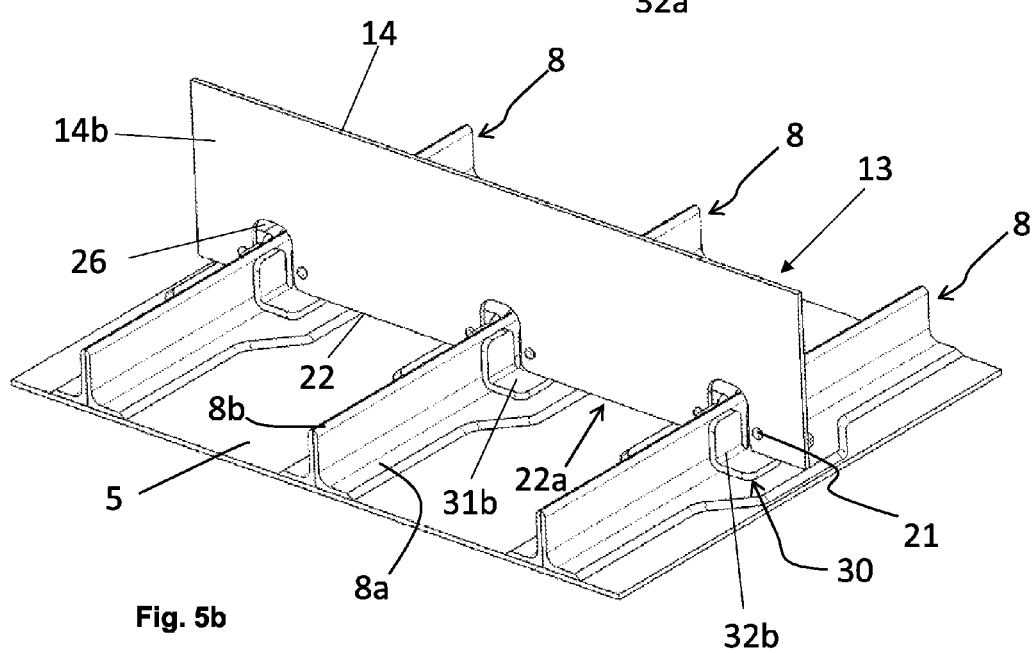
FIG. 5b is an isometric view of the structure of FIG. 5a from the outboard direction.
Figure 6:
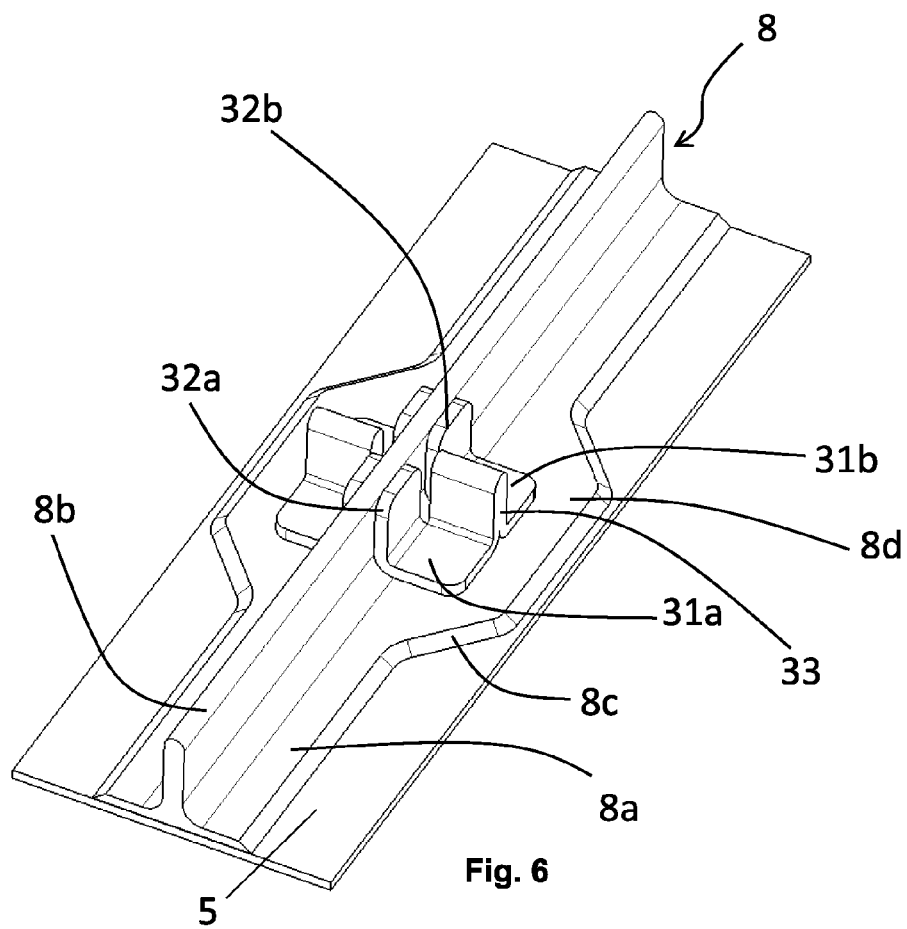
FIG. 6 is an isometric view of the structure of FIGS. 5a and 5b with the rib removed.

FIGS. 5a and 5b show a structure forming part of the interface between one of the baffle ribs 13 and the lower cover 5 including three of the stringers 8. The stringers 8 are CFRP laminate components. Each stringer 8 has a T-shaped cross-section with a pair of flanges 8a co-cured to the cover 5, and a web or blade 8b extending upwardly from the flanges 8a away from the cover 5 to a free upper edge. Each flange 8a has a tapering lateral edge 8c and a protruding grow out region 8d (FIG. 6). The stringers 8 have a "roll-formed" structure in which the flanges 8a and web 8b are formed from a single folded sheet.

The baffle rib 13 comprises a planar metallic web 14 connected to the upper and lower covers by a plurality of CFRP laminate rib feet 30.

Figure 3:
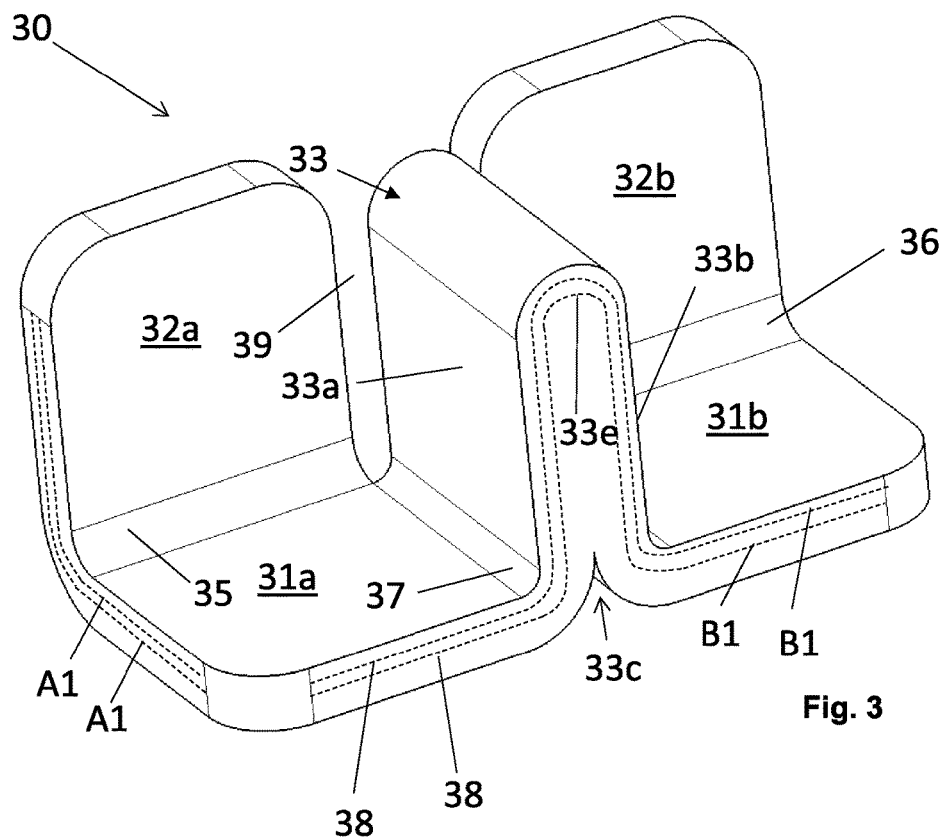
FIG. 3 is an isometric view of a rib foot according to a first embodiment of the invention.
Figure 4:
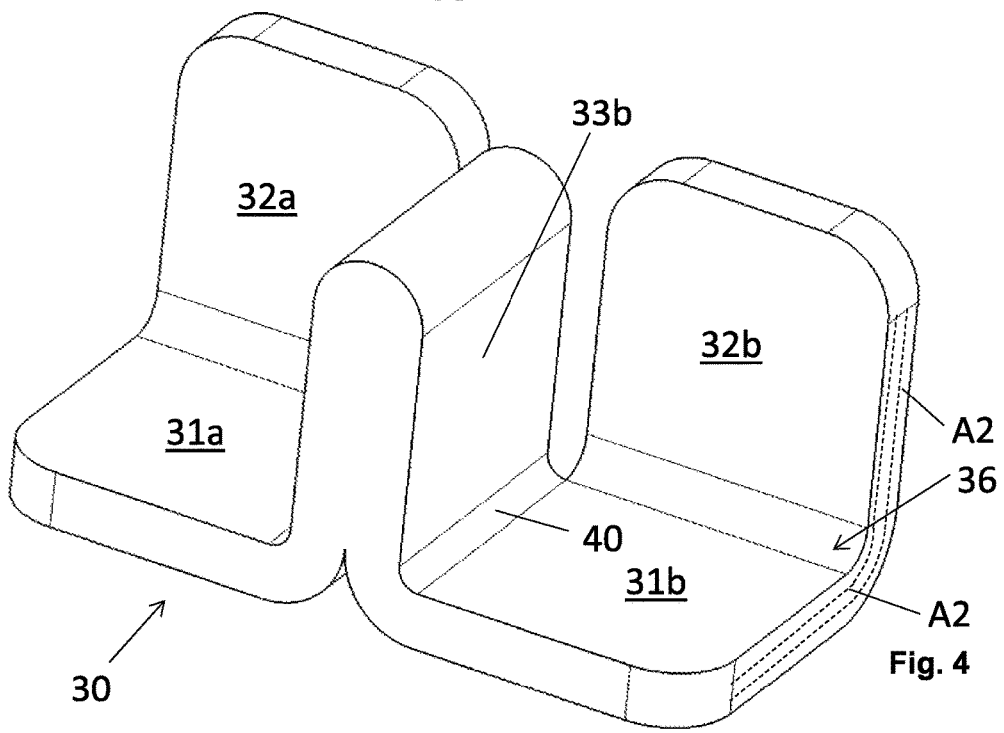
FIG. 4 is an alternative isometric view of the rib foot of FIG. 3.

As shown in FIGS. 3 and 4, each rib foot 30 has a generally horizontal first base part 31a, a generally horizontal second base part 31b, a first flange 32a, a second flange 32b, and an upstanding blade 33 separate from the flanges 32a,b by a gap 39. The blade 33 is formed by a pair of folded blade parts 33a, 33b which each extend from a blade foot 33c to a blade tip 33d, where they meet to form a bight. The first base part 31a is connected to the first blade part 33a via a first folded corner 37. As shown in FIG. 4, the second base part 31b is connected to the second blade part 33b via a second folded corner 40. The first flange 32a is connected to and extends away from the first base part 31a via a third folded corner 35 and the second flange 32b is connected to and extends away from the second base part 31b via a fourth folded corner 36.

As will be explained in further detail below, the rib foot is formed from a laminar structure with layers extending between the first flange 32a and the second flange 32b via the first base part 31a, the blade 33 and the second base part 31b.

Referring now to FIGS. 5a, 5b and 6, the first and second flanges 32a, 32b are co-cured to the stringer web 8b, and the first and second base parts 31a, 31b are co-cured to the protruding grow-out region 8d of the stringer flange 8a. This co-cured joint (without bolts) between the first and second base parts 31a, 31b and the stringer flange 8a mean that no drilled bolt holes need to be provided in the cover 5 or the stringer flange 8a. This enables the thickness (and hence weight) of the cover 5 to be reduced compared with a bolted arrangement. The lack of external bolts in the cover 5 also provides protection against lightning strike and improved fuel tank sealing.

Each stringer 8 is joined to the rib by a pair of rib feet 30—one on each side of the stringer web 8b—which are mirror images of each other.

The blade 33 is joined to the rib web 14 by bolts 21 (shown in FIGS. 5a and 5b).

The rib web 14 has planar inboard and outboard faces 14a, 14b on opposite sides of the rib which meet at a lower edge 22 shown in FIGS. 5a and 5b, and an upper edge (not shown in FIGS. 5a and 5b). The inboard face 14a of the rib web is visible in FIG. 5a and the outboard face 14b is visible in FIG. 5b. The lower edge 22 is separated from the inner surface of the cover 5 by a gap 22a. Fuel can flow across the rib web 14 through this gap 22a. The lower edge of the rib web 14 is also formed with recesses or cut-outs through which the stringer webs 8b pass. Fuel can also flow through the arched upper part 26 of each cut-out. Holes (not shown) may also be provided in the rib web 14 to minimise its weight and provide further routes for fuel to flow.

The blade 33 is bolted to the inboard face 14a of the rib web adjacent to the lower edge 22 as shown in FIG. 5a. The first rib foot base part 31a extends in an inboard direction away from the inboard face 14a of the rib web as shown in FIG. 5a, and the second rib foot base part 31b crosses the rib through the gap 22 and then extends in an outboard direction away from the outboard face 14b of the rib web as shown in FIG. 5b.

In an alternative embodiment (not shown) the blade 33 is joined to the outboard face 14b of the rib web.

In both of these embodiments the rib foot web 33 and the rib web 14 have opposed mating faces which are joined at a web joint interface which lies in a plane (i.e. the plane of the inboard face 14a or the plane of the outboard face 14b depending on which face of the rib is used to attach the rib foot). For each rib foot the pair of rib foot flanges are positioned on opposite sides of this plane, as are the pair of rib foot base parts. This provides a balanced arrangement.

Only the lower edge 22 of the rib web 14 is shown in FIGS. 5a and 5b. The upper edge of the rib web 14 may be connected to the upper cover 4 by rib feet 30 in a similar fashion, or it may be connected to the upper cover 4 by more conventional rib feet.

The rib web 14 also has fore and aft edges (visible in FIG. 2a) which are secured to the spars 6, 7 respectively.

Figure 7:
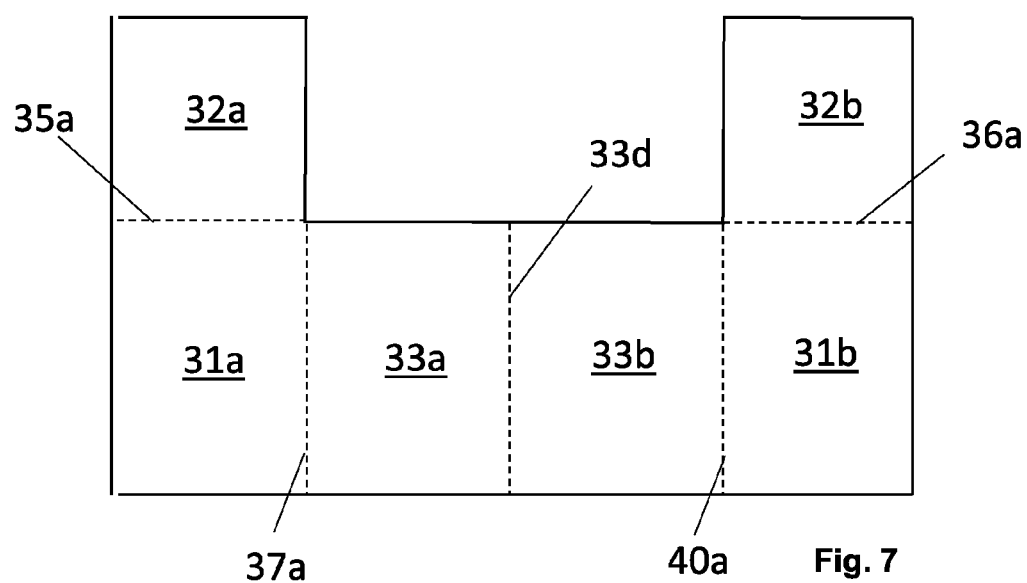
FIG. 7 is a plan view of the blank for forming the rib foot of FIGS. 3 and 4.
Figure 8:
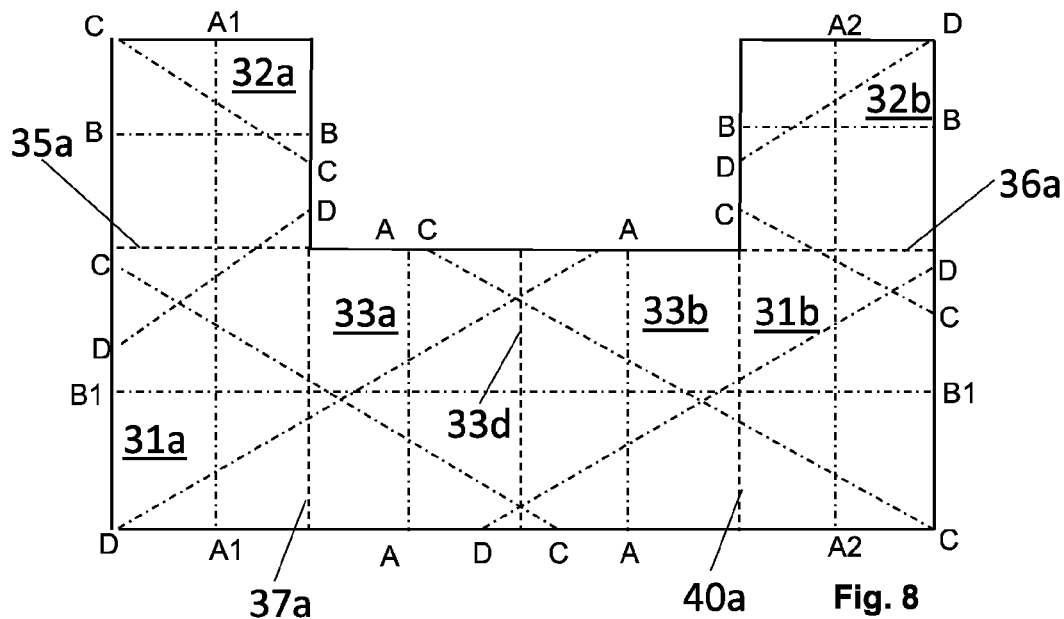
FIG. 8 is the plan view of the blank of FIG. 7 showing some of the reinforcement fibres.

Each rib foot 30 is formed from a blank comprising a flat stack of pre-preg composite plies or layers in the shape shown in FIGS. 7 and 8. Each ply in the stack has unidirectional carbon fibres impregnated with an epoxy resin matrix. The portions of the flat blank corresponding with the various parts of the folded rib foot are labelled in FIGS. 7 and 8.

The blank is bent or folded along a line 33d where the first and second blade parts 33a, 33b meet to form the folded bight at the tip of the blade 33. The blank is also folded along lines 37a, 40a where the first and second base parts 31a, 31b meet the blade parts 33a, 33b to form the corners 37, 40. The corners 37, 30 and the bight may be formed simultaneously by running the blank through a roll forming machine, or formed one after the other by a press forming machine.

The blank is also folded by a press forming machine along lines 35a, 36a where the first and second flanges 32a, 32b meet the base parts 31a, 31b, respectively, to form the corners 35, 36.

The carbon fibres in each ply of the blank are oriented at either 0 degrees, +/−45 degrees or 90 degrees. FIG. 8 shows by way of example four 0 degree fibres A, A1, A2; three 90 degree fibres B, B1; four +45 degree fibres C; and four −45 degree fibres D.

Some of the 0 degree fibres (labelled A1 in FIGS. 3 and 8) run continuously from the first rib foot base part 31a into the first flange 32a via a curve at the folded corner 35. Some of the 0 degree fibres (labelled A2 in FIGS. 4 and 8) run continuously from the second rib foot base part 31b into the second flange 32b via a curve at the folded corner 36. Some of the 90 degree fibres (labelled B1 in FIGS. 3 and 8) run continuously from the first base part 31a into the second base part 31b via a curve at the folded corner 37, a bight 33e at the blade tip 33d, and a curve at the folded corner 40. In this way, loads are transferred by the carbon fibres around each of the folded corners.

One of the loads acting on the structure is fuel pressure load which acts down on the lower cover as indicated by arrow 19a, and is reacted as tension 19b in the rib web 14. The primary path for this load is through the base parts 31a,b and the blade 33 of the rib foot via the curved corners 27, 40.

The gap 39 between the flanges 32a,b and the blade 33 means that there is no direct load path between them. This is beneficial since it ensures that all of the fuel pressure load tracks into the rib via the primary load path. As a result the primary failure mode of the structure is the blade foot 33c peeling away from the stringer flange, which will only fail at very high loads.

The gap 39 is also beneficial since it allows the blade 33 to move slightly relative to the flanges 32a,b during operation of the aircraft without placing strain on the rib foot.

The gap 39 is also beneficial since it enables the flanges 32a,b to be bent at any angle away from the base parts 31a,b (for instance 90 degrees as shown in the drawings, or a different angle).

The stack of pre-preg plies includes a pair of external plies and a plurality of internal plies sandwiched between the external plies. The external plies and the internal plies (along with most if not all of the other internal plies in the stack) run continuously throughout the rib foot from the first flange 32a into the first base part 31a via the corner 35, from the first base part 31a into the blade 33 via the corner 37, from the blade 33 into the second base part 31b via the corner 40, and from the second base part 31b into the second flange 32b via the corner 36.

Figure 9:
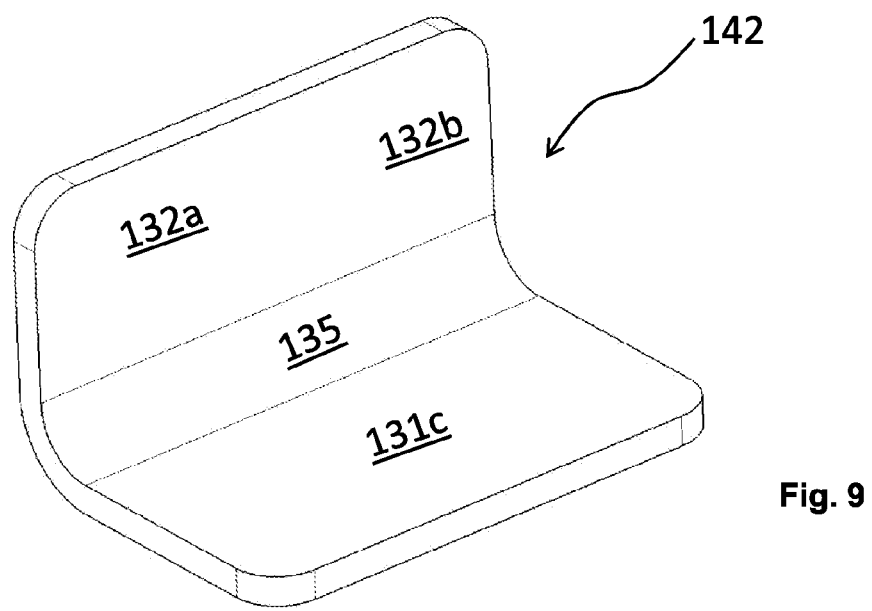
FIG. 9 is an isometric view of a second piece of a rib foot according to a second embodiment of the invention.
Figure 10:
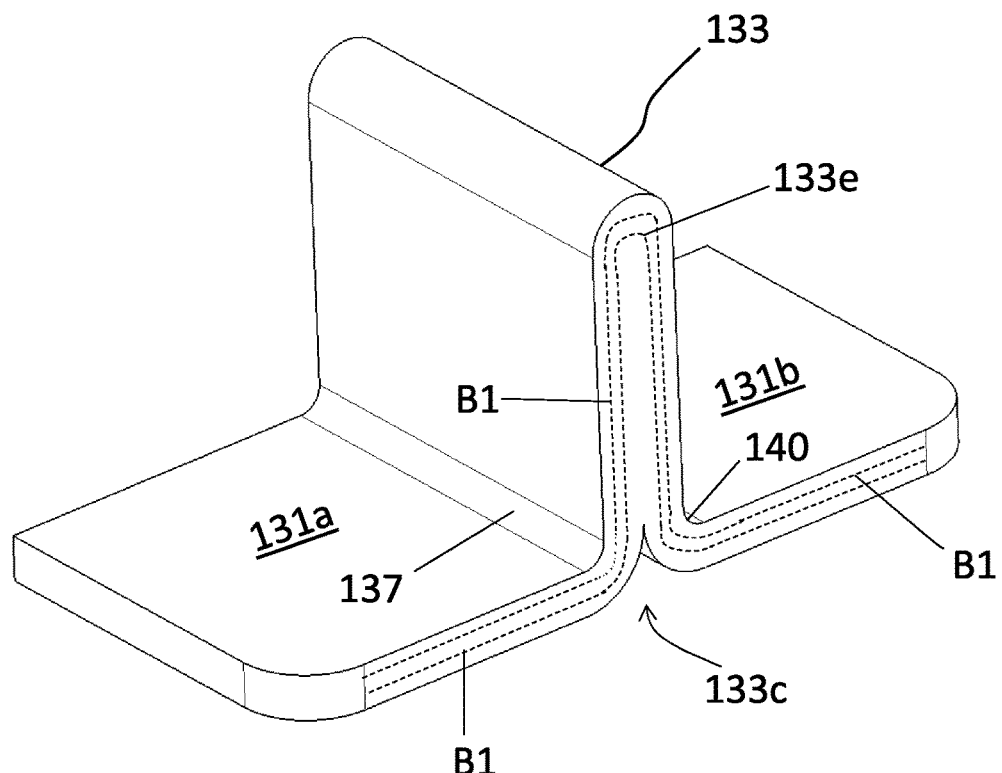
FIG. 10 is an isometric view of a first piece of a rib foot according to the second embodiment of the invention.
Figure 11:
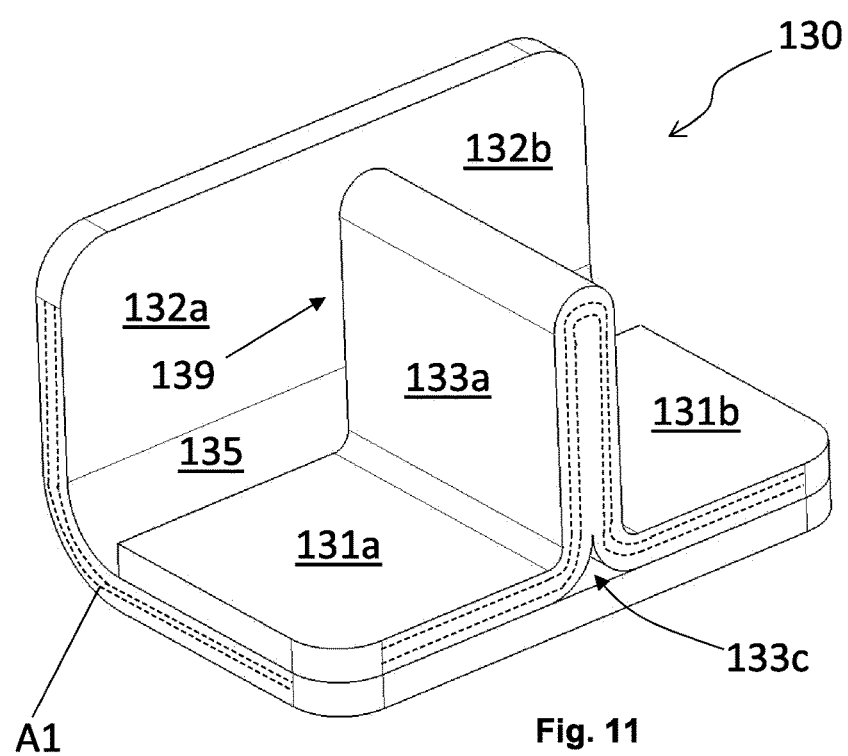
FIG. 11 is an isometric view of a rib foot according to the second embodiment of the invention.

In a second embodiment, rather than being formed from a single piece as in the first embodiment, each rib foot 130 is formed from a T-shaped piece 133 shown in FIG. 10 and an L-shaped piece 142 shown in FIG. 9, bonded together to form the rib foot 130 of FIG. 11. The rib foot 130 is similar to the rib foot 30 in the first embodiment, and like features in the rib foot 130 are depicted with like reference numerals (preceded by the number 1) so will not be described further.

The L-shaped piece 142 has a horizontal connecting part 131c and an upright flange comprising a first flange portion 132a and a second flange portion 132b, each connected to the connecting part 131c by a corner 135. The T-shaped piece 133 has a similar construction to the rib foot 30 of the first embodiment, but without the integrally formed flanges 32a, 32b.

The first and second flange portions 132a, 132b are equivalent to the flanges 32a, 32b in the first embodiment. Unlike in the first embodiment, in which the first and second flanges are separated by a gap, in the second embodiment the first and second flange portions 132a, 132b are integrally formed as part of the same piece, so that at least some of the reinforcement fibres run directly from the first flange portion 132a into the second flange portion 132b, without running into the T-shaped piece 133.

As shown in FIG. 11, the rib foot 130 is formed by co-curing the two pieces 133, 142 together, with the upper face of the connecting part 131c contacting the lower faces of the parts 131a, 131b. A noodle filler (not shown) is used to fill the gap between the blade foot 133c and the connecting part 131c.

In an alternative embodiment, instead of being formed by two pieces (as in FIG. 11) the rib foot may be formed by three pieces (a T-shaped piece 133 and two narrow L-shaped pieces each providing a respective flange). Each narrow L-shaped piece is similar to the L-shaped piece 142, but narrower. Each narrow L-shaped piece sits on top of a respective rib foot base part 131a, 131b, and is co-cured to the upper face of its respective rib foot base part 131a, 131b.

In the embodiments described above the rib feet 30, 130 and stringers 8 are formed as separate components which are joined together by co-curing opposed mating faces. Alternatively, some of the internal plies forming the rib feet 30, 130 may be laid up so that they are interleaved with some of the internal plies forming the stringers 8.

The cover assembly of FIG. 6 is formed by placing the various components on a mould in an un-cured or partly cured state. A vacuum bag is laid over the components on the mould, the space between the vacuum bag and the mould is evacuated to apply pressure, and the assembly is heated to cure the components. As the components cure, the various co-cured joints mentioned above are formed. The mould may be made from a rigid material, or more preferably from a semi-rigid material. A suitable semi-rigid material is a synthetic rubber such as Airpad (an uncured non-silicone rubber available from Airtech Europe Sarl), reinforced with open weave dry carbon such as Cristex 170-100, with additional local reinforcement and therefore stiffness added with Toolmaster (R) Pre-preg TMGGP4000 and TMGP4100.

Although the invention has been described above with reference to one or more preferred embodiments, it would be appreciated that various changes or modifications may be made without departing from the scope of the invention as defined in the appended claims.

The invention claimed is:

1. A rib foot having a blade extending from a blade foot to a blade tip; a first base part connected to the blade foot by a first corner; a second base part connected to the blade foot by a second corner; a first flange part connected to and extending from the first base part; and a second flange part connected to and extending from the second base part; wherein the blade and the base parts are formed from a composite material including reinforcement fibres, at least some of the reinforcement fibres run continuously from the first base part into the second base part via the first corner, via a bight at the blade tip, and via the second corner, and wherein the rib foot comprises a gap between the flange parts and the blade.

2. The rib foot according to claim 1 wherein the first flange part is connected to the first base part by a third corner and at least some of the reinforcement fibres run continuously from the first base part into the first flange part via the third corner.

3. The rib foot according to claim 1 wherein the second flange part is connected to the second base part by a fourth corner and at least some of the reinforcement fibres run continuously from the second base part into the second flange part via the fourth corner.

4. The rib foot according to claim 1 wherein the first flange part is formed from a separate piece which is connected to the first base part by a bonded joint, or the second flange part is formed from a separate piece which is connected to the second base part by a bonded joint.

5. The rib foot according to claim 1 wherein the first base part extends away from a first side of the blade foot, and the second base part extends away from a second side of the blade foot opposite to the first side of the blade foot.

6. The rib foot according to claim 1 wherein the composite material comprises a plurality of layers, and at least one of the layers comprises reinforcement fibres which run continuously from the first base part into the second base part via the first corner, the bight at the blade tip, and the second corner.

7. A structure having a panel, a stringer and a rib; wherein the stringer includes a stringer flange joined to the panel and a stringer web extending away from the stringer flange; and the rib includes a rib web and a rib foot according to any preceding claim with the blade of the rib foot joined to the rib web, the first and second base parts of the rib foot joined to the panel or to the stringer flange, the first and second flange parts of the rib foot joined to the stringer web, and wherein the rib foot comprises a gap between the flange parts and the blade.

8. The structure according to claim 7 wherein the first and second flange parts are joined to the stringer web by co-bonded or co-cured joints.

9. The structure according to claim 7 wherein the first and second base parts are joined to the panel or to the stringer flange by co-bonded or co-cured joints.

10. The structure according to claim 7, wherein the structure is an aerodynamic aircraft structure.

11. The structure according to claim 10, wherein the structure is an aircraft wing box.

12. An aircraft comprising a fuselage and a structure according to claim 10 attached to and extending away from the fuselage.

13. A method of forming a rib foot, the method including the steps:

(a) forming a blank from a composite material including reinforcement fibres, the blank comprising first and second blade parts, first and second base parts, and first and second flange parts;

(b) bending or folding the blank where the first and second blade parts meet so that the first and second blade parts together form a blade with a blade foot and a blade tip;

(c) bending or folding the blank where the first and second base parts meet the first and second blade parts to form respective first and second corners; and (d) bending or folding the blank where the first and second flange parts meet the first and second base parts to form respective first and second flanges which meet the first and second base parts at respective third and fourth corners, wherein at least some of the reinforcement fibres run continuously from the first base part into the second base part via the first corner, a bight at the blade tip, and the second corner; wherein at least some of the reinforcement fibres run continuously from the first base part into the first flange via the third corner; and wherein at least some of the reinforcement fibres run continuously from the second base part into the second flange via the fourth corner, wherein a gap exists between the flange parts and the blade.

* * * * *